Aug. 9, 1949.  G. R. ECKSTEIN  2,478,381
WEIGHING DEVICE

Filed March 16, 1946  4 Sheets-Sheet 1

INVENTOR
GEORGE R. ECKSTEIN
BY
John H. Lewis Jr.
ATTORNEY

Aug. 9, 1949.　　　　G. R. ECKSTEIN　　　　2,478,381
WEIGHING DEVICE
Filed March 16, 1946　　　　　　　　　　4 Sheets-Sheet 2

INVENTOR
GEORGE R. ECKSTEIN
BY
John H. Lewis Jr.
ATTORNEY

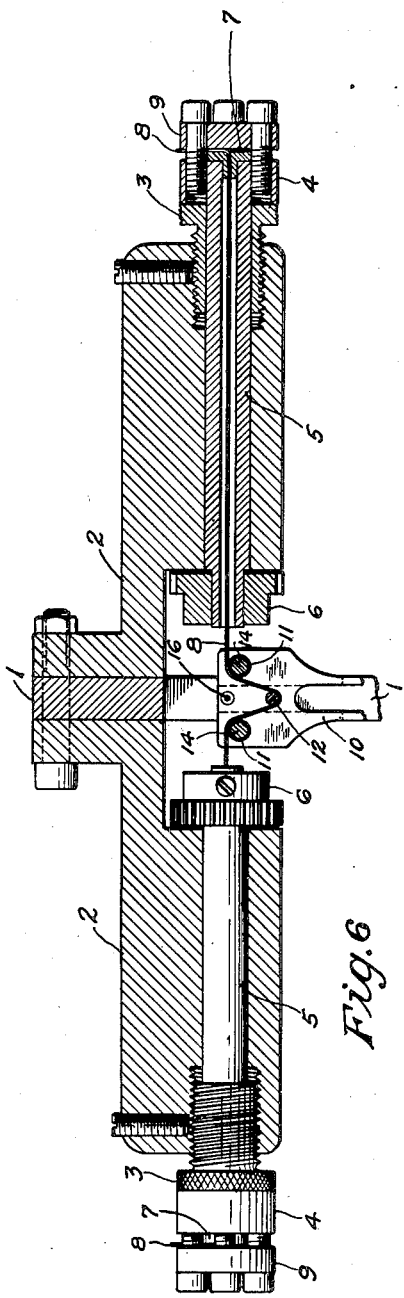
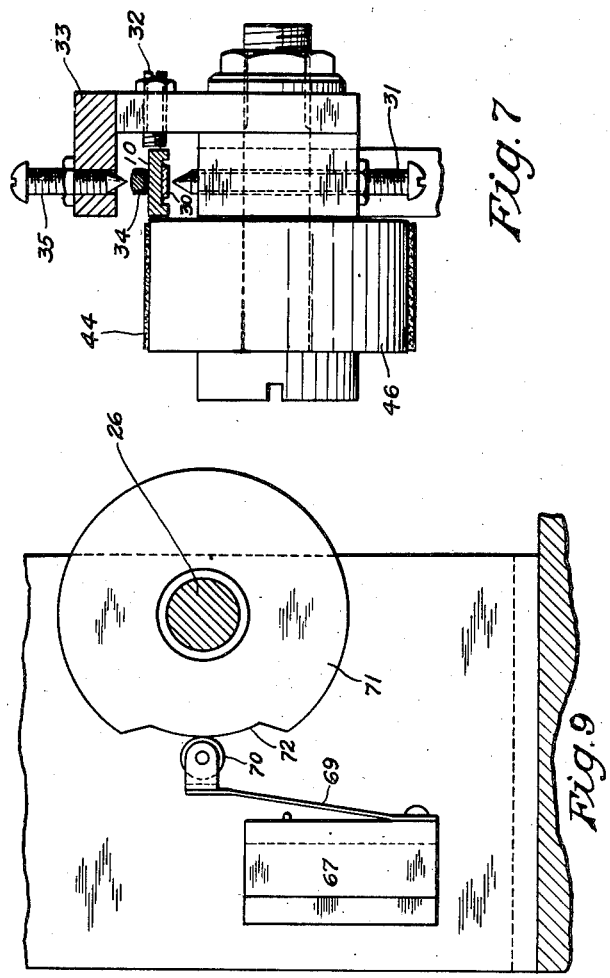
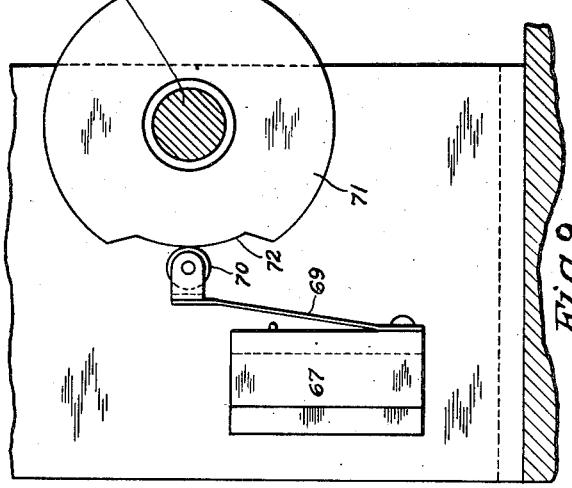

Patented Aug. 9, 1949

2,478,381

UNITED STATES PATENT OFFICE 2,478,381

WEIGHING DEVICE

George R. Eckstein, Bridgeport, Conn., assignor to Remington Arms Company, Inc., Bridgeport, Conn., a corporation of Delaware Application March 16, 1946, Serial No. 654,842

12 Claims. (Cl. 209—121)

1

This invention relates to a weighing device and more particularly to an automatic weighing device adapted for repetitive weighing operations of great accuracy on a production line basis.

In the manufacture of small multiple component articles and particularly in connection with the manufacture of small arms ammunition, there are frequent occasions where a precise weighing operation is the only non-destructive method of inspection insuring that all components are present and that none of the components have been duplicated. Heretofore, such precise weighing could only be carried out on laboratory type instruments and the cost of such operations precluded their application on any other than a spot check basis. Since the defects sought were not apt to occur with any great frequency, a spot check was of little utility.

Accordingly, it is the object of this invention to present a weighing machine capable of continuous operation in the performance of weighing operations of laboratory precision.

It is a further object of this invention to present a machine capable of production line assorting of small mass produced articles of manufacture in accordance with their weight to extremely precise standards.

A more specific object of this invention is the presentation of a machine capable of weighing ammunition primers and similar small components as they come from the production line with precision adequate for the detection of missing or double charges, missing metallic components such as anvils or washers, and other irregularities. The weight variations which must be capable of being separated from the acceptable product are expressed in terms of fractions of grains.

The present invention contemplates accomplishing these objects by the use of a torsion balance, articles being automatically fed onto the weight arm of the balance and allowed to rest there as torsion is applied to the wire. When sufficient torsion has been applied to lift the weight arm the article is automatically ejected therefrom into compartmented receiving means positioned in accordance with the amount of torsion applied at the instant of ejection, which indicates directly the weight of the article.

The exact nature of the invention as well as other objects and advantages thereof will become apparent upon consideration of the drawing in which:

Fig. 1 is a perspective view of the complete machine.

2

Fig. 6 is an enlarged horizontal cross-sectional view on the lines 6—6, illustrating the mounting of the torsion wire.

Fig. 7 is a partial enlarged vertical cross-sectional view on the line 7—7, illustrating the mounting of the contact points and movement stops for the weighing arm.

Fig. 9 is an enlarged partial sectional view taken on the line 9—9 of Fig. 2.

Torsion balance

Figure 1:
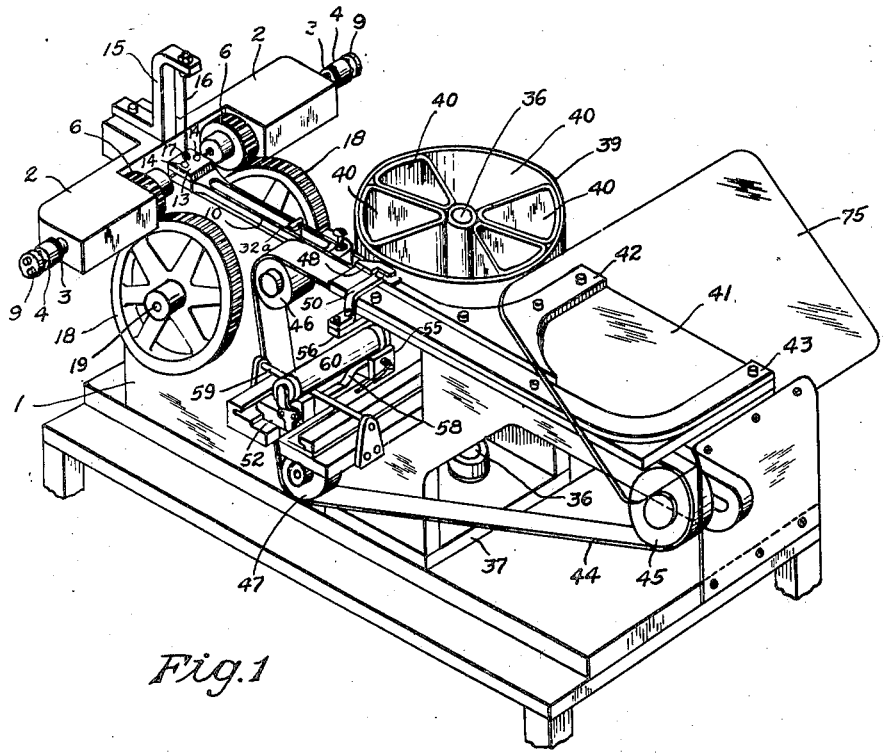
Figure 4:
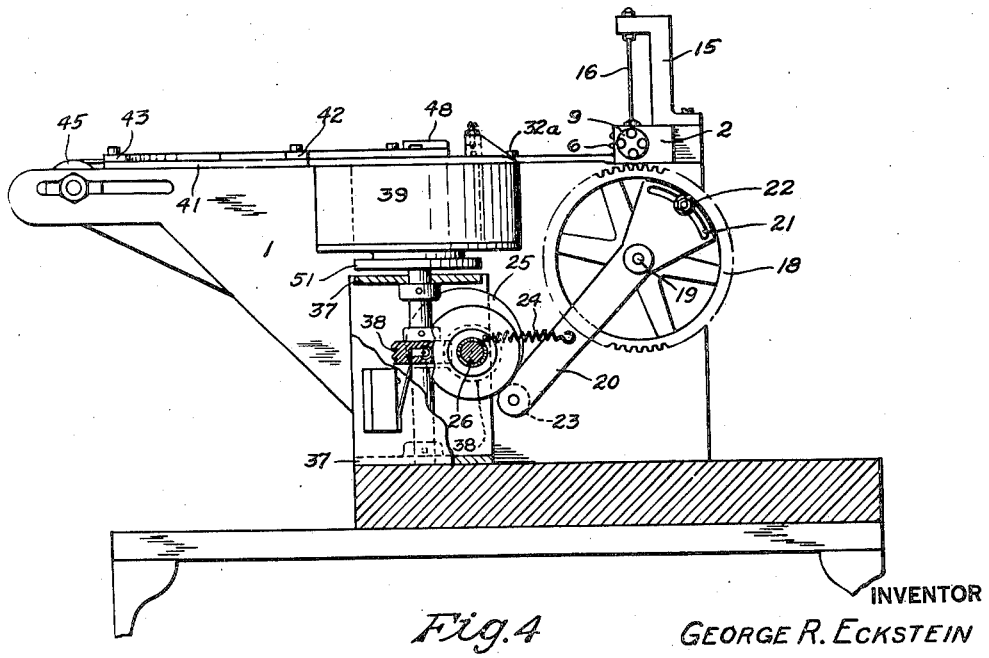
Fig. 4 is a left side elevational view.

Referring to the drawing by characters of reference, it may be seen that the machine comprises a main frame 1 on which are mounted at one end the two identical opposed wire supports 2. The wire supports are coaxially bored, and in a threaded counterbore at the outer end each receives a tension adjusting nut 3. The tension adjusting nuts 3 serve as thrust bearings to engage the flanged heads 4 of the torsion sleeves 5 which are journaled in the wire supports and which extend therethrough a sufficient amount to permit the pinions 6 to be secured to the inner ends of the sleeves. The outer end of each sleeve is provided with a wire centering bushing 7 through which the torsion wire 8 is passed and bent over. A wire clamp plate 9 is provided and set screws are arranged to draw the plate into engagement with the centering bushing, thus clamping the wire therebetween and preventing slippage of the wire either torsionally or in tension.

The balance arm 10 is provided at the end engaging the wire with two inset bushings 11 to which the line of the wire forms a tangent and which are partially encircled by the wire which passes around a dowel 12 also fixedly mounted in the arm. A clamping pad 13 is drawn against the weight arm in clamping engagement with the wire by screws 14 passing through the bushings and threadably engaging the body of the balance arm.

The balance arm 10 is preferably formed of aluminum or other light metal but in spite of that fact there is an appreciable dead load on the wire. In order to minimize the effects of vibration and to reduce the straight tension load in the wire, there has been provided a bracket 15 mounted on the frame and supporting a very fine balancing wire 16 which passes through an enlarged hole 17 in the clamping pad 13 and engages the balance arm in alignment with the axis of the torsion wire. In this way the dead weight load of the balance arm and wire clamping means is carried without appreciably affecting the purely torsional character of the force tending to lift the free end of the balance arm.

As previously noted, pinions 6 are secured to the torsion sleeves 5. The pinions 6 are engaged by torsion drive gears 18 which are fixedly mounted on a common shaft 19 journaled in the main frame. The drive gears are operated by an arm 20 journaled on the shaft 19 and provided with a circular slot 21 permitting an adjustable connection by means of a locking screw 22 engaging one of the drive gears 18. The free end of the arm 20 is provided with a cam follower 23 and is biased by a spring 24 into engagement with a torsion drive cam 25. The drive cam 25 provides a uniform follower displacement per degree of rotation out to a maximum displacement with a more abrupt return to the start. The cam is mounted to rotate with the main shaft 26 which is driven by any suitable means such as the belt 27 and electric motor 28. As the main shaft rotates, the cam acting on the cam roller applies a continuous smoothly increasing displacement to the arm 20 which through the gear train applies torsion simultaneously to the ends of the torsion wire. The cycle of uniformly increased torsion and return to the starting point is completed for each revolution of the main shaft.

The free end of the balance arm is provided with a flat area 29 (Fig. 2) on which the object to be weighed may be placed. A short distance in from the free end (detail in Fig. 7), a glass plate 30 has been cemented to the lower face of the arm and provides a substantially friction-free bearing surface for engagement with a pointed support 31 limiting downward displacement of the arm under minimum torque conditions. A limiting stop 32 may be supported by the same contact holding block 33 as the support 31 and serves to limit the amount of sidewise displacement of the arm as the article to be weighed is placed on the arm while a stop 32a secured to the frame limits upward movement. Except during the application of a side load, the tension in the torsion wire is adequate to keep the arm from contacting stop 32. Upon the upper face of the arm there is provided a cup 34 in which a small amount of mercury is placed and in opposition to the mercury in the cup the contact holder supports a contact point 35. As soon as torsion lifts the balance arm and the article placed thereon, an electrical circuit is established including the contact point 35, the mercury pool, and the balance arm. The utilization of this circuit will be discussed in more detail hereafter.

Receiving tray

A vertical shaft 36 is supported in suitable bearings in the side frame 37 and by means of gears 38 has a 1 to 1 drive with respect to the main shaft 26. Mounted on the top end of the vertical shaft to rotate therewith is the receiving tray 39 within which are positioned in non-rotatable but removable relation thereto a number of segmental receiving buckets 40. It will be obvious from consideration of the gearing employed that there will be a position of the tray corresponding exactly with the amount of torsion applied to the wire at the particular instant. As torsion is applied to the wire the tray will rotate and will always occupy a position in regard to the free end 29 of the balance arm corresponding to the torque applied to the wire. Thus, each of the segmental buckets 40 corresponds to a range of weights determined by the physical constants of the wire, the rate of climb of the cam, and the number of degrees intercepted by the bucket. As previously noted, the balance arm is raised, completing an electrical circuit at the instant the torque overcomes the resistance of the load. The completion of the circuit actuates, as will presently be shown, an ejection means which drops the article being weighed into the bucket then opposed to the balance arm, which is the bucket corresponding to the weight of the article. Calibration may be checked by operating the machine with known weights.

Feeding and ejection

Attached to the main frame 1 is a horizontal or slightly inclined feed tray 41 upon which the articles to be weighed may be placed and which is provided with guide rails 42 and 43 channeling the articles toward a feed belt 44 running underneath the narrow feed channel between the guide rails. The feed belt is carried on idler pulleys 45 and 46 journaled on the main frame and is driven by pulley 47 mounted to rotate on the main shaft 26. The belt is of such character as to frictionally engage the articles to be weighed and to urge them down the channel but slips beneath the articles when the foremost engages the abutment 48 at right angles to the delivery end of the channel. A transverse feed channel 49 is here provided through which the articles are fed individually by reciprocation of the feed finger 50. The operation of the feed finger is by means to be next described and its cycle is as follows:

First: Advance stripping the leading article from the feed channel and delivering it through the transverse channel to the balance arm.

Second: Retract slightly away from contact with the article or the balance arm.

Third: Upon closing of the circuit by raising of the balance arm, advance abruptly and discharge the article into the appropriate bucket.

Fourth: Retract to the starting position in readiness for another cycle.

The operation of the feeding cycle is governed by the feed cam 51 attached to and rotatable with the vertical shaft 36 so that one complete feeding cycle is performed for each rotation of the main shaft. A feed slide 52 is mounted for transverse sliding movement on the side frame 37 and is provided with a cam follower 53 riding on the cam 51 and a spring 54 constantly urging the feed slide toward the cam. Brackets 55 mounted on the feed slide provide a pivotal mounting for the feed finger carrier 56 and a mousetrap spring 57 constantly urges the feed finger carrier in a direction toward the balance arm. As the feed slide is retracted, a cam surface 58 on the lower arm of the feed finger carrier engages a fixed rod 59 mounted on the frame, camming the carrier back in a direction to further tension the spring 57. A solenoid 60 is mounted on the feed slide with its core 61 opposed to a contact plate 62 on the upper arm of the feed finger carrier and has the function of holding the carrier in spring cocked position until released by operation of a relay on closing of the circuit through the balance arm. The release of the spring by the solenoid provides the abrupt movement of the third part of the cycle above mentioned.

Figures 2, 3:
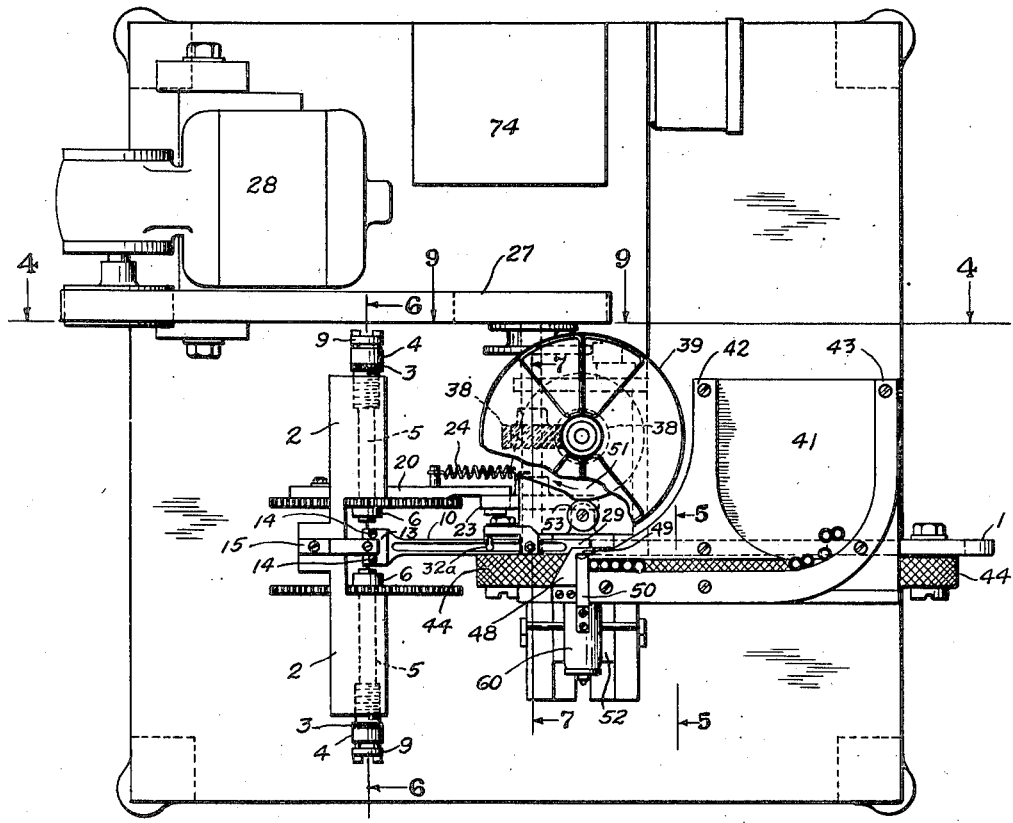
Fig. 2 is a top plan view.
Fig. 3 is a right side elevational view.
Figure 5:
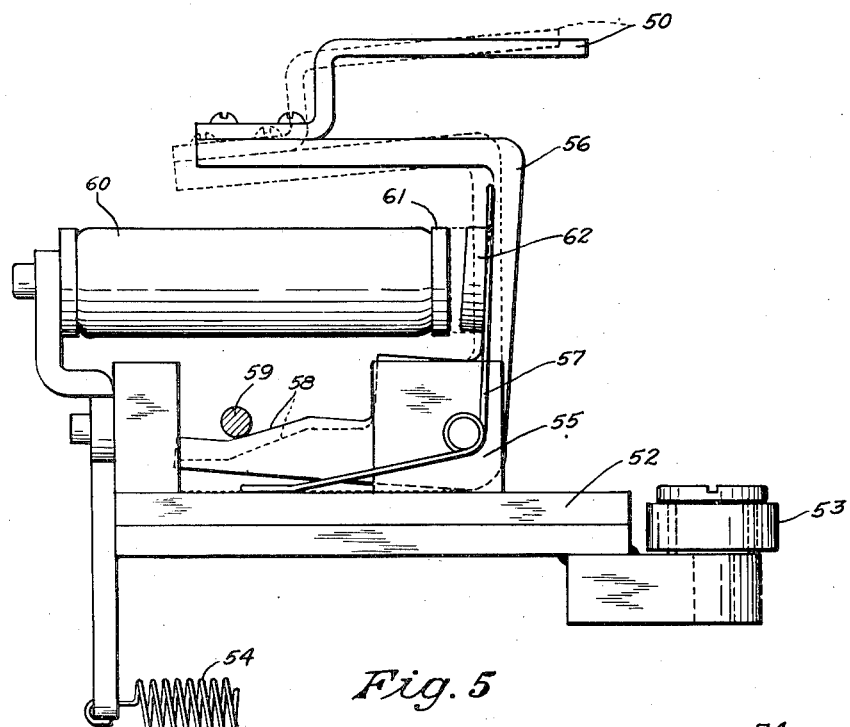
Fig. 5 is an enlarged partial sectional view on the lines 5—5, showing the feeding and ejection mechanism in some detail.

The feed cam best shown in Fig. 2 is preferably formed with a fairly abrupt lobe timed to retract and advance the feed slide just after the release of torsion on the wire and prior to the application of any significant amount of torsion on the next cycle. The advancing of the feed slide mentioned as the first step of the cycle is under the impulse of the spring 54 which urges the feed slide to follow the cam as it retracts. The retraction mentioned as the second step is as a result of a depression in the cam which permits a slight over-travel of the feed slide before retracting to ride on a dwell of the cam as the weighing operation takes place. As noted before, the third step is a release of the feed finger in response to the lifting of the balance arm. The fourth step or retraction of the feed slide to pick up a new article takes place substantially simultaneously with the release of torsion of the wire.

Electrical circuit

Figure 8:
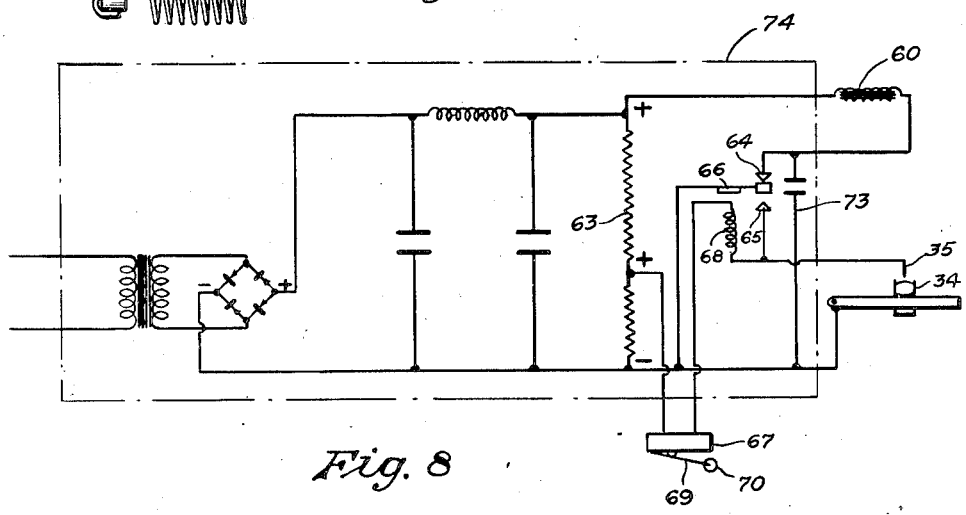
Fig. 8 is a schematic wiring diagram.

By referring in detail to Fig. 8, the operation of the electrical circuit elements will be more clearly understood. In order to avoid the possibility of chattering and vibration of an A. C. solenoid affecting the accuracy of the weighing operation, it has been deemed preferable to use direct current for the actuation of the solenoid. The left hand portion of Fig. 8 consists, therefore, of a conventional bridge rectifier and filter choke network delivering rectified and filtered current to the voltage divider 63. From the positive end of the voltage divider one circuit is set up through the solenoid coil 60, the normally closed contact 64 of the relay 65, and the armature 66 of the relay back to the negative end of the voltage divider. A second circuit may be traced from an intermediate point on the voltage divider 63 through the normally open micro-switch 67, the coil 68 of relay 65, the balance arm contact 35, the mercury pool 34, and through the balance arm back to the negative end of the voltage divider. The micro-switch 67 is provided with an actuating lever 69 having a cam follower 70 which rides on a cam 71 secured to the main drive shaft 26. The cam is formed with a cut-away portion 72 which registers with the follower and permits the circuit to be open during the interval in which torsion is being released on the wire and feeding is taking place, preferably a short interval is also allowed for the settling out of any vibration incident to placing the article on the balance arm. During the rest of the cycle, the micro-switch is held closed and the relay will be actuated as soon as the balance arm has been raised sufficiently to close the circuit through the mercury pool. Upon actuation of the relay, the circuit through the solenoid is broken, releasing the spring and operating the feed finger in its ejection stroke. A condenser 73 is placed across the relay contacts to minimize arcing and to contribute to the rapid decay of flux in the solenoid. After ejection of the weighed article into its proper bucket and prior to the retraction of the feed slide for picking up a new article, the follower 70 drops into the cut-out 72 on the cam 71 opening the circuit through the relay, permitting the contact 64 to be closed, and re-establishing the circuit through the solenoid. The solenoid will thus be in condition to hold the feed finger carrier when it is cammed downwardly by retraction of the feed slide. Obviously, the polarity of these circuits may be reversed and with proper precaution against vibration even A. C. could be used.

The dot and dash line enclosing certain portions of Fig. 8 schematically indicates the unit container 74 within which those electrical elements are housed.

Miscellaneous

When the articles to be weighed are of a somewhat hazardous nature, such as ammunition primers, there may be provided a transparent shield 75 of suitable dimensions to protect the operator from any blast without interfering with vision or seriously hampering the feeding of primers onto or across the feed tray.

For clarity in illustration, the machine has been shown with safety guards removed. Obviously, in use of the machine it is desirable that guards and housings be provided for all belts, gears, and other components likely to injure a careless operator or, like the balance wire, of such delicate construction as to be themselves susceptible of injury.

Operation

The operation of the machine will be described with reference to the automatic weighing and classification of ammunition primers. It will, however, be obvious that by suitable choice of the dimensions of the feed mechanism and suitable adjustment of the torsion balance it may be used for the weighing of any small articles.

An ammunition primer generally comprises a small cup-like body having a flat base and containing a priming charge, an anvil, foil disks, and in some special cases other components. The open end of the cup may be crimped in to partially close the open end of the cup and retain the components therein. The assembly is so small and so completely closed that it is impossible to determine by visual means whether all essential components are present and whether or not there are duplicates of any components. Obviously, any destructive method of testing is not practical and to be certain of catching the occasional defective primer any test utilized must be applied to all primers. The total permissible variation in weight within which it may be stated with certainty that the proper amounts of all essential components are in place is in the order of fractions of grains.

In applying this automatic weighing check to such primers, they are transferred from trays on which they have been arranged in axially vertical position onto the feed tray. By means of a manually operated pusher, the primers are fed across the tray to a position in which they are picked up by the feed belt and carried down the channel to rest against the abutment at the end thereof. As the machine rotates, the feed cam retreats from the feed slide, allowing the same to be advanced by the feed spring and allowing for sufficient overtravel of the feed finger to position the primer on the end of the balance arm before retracting to stand clear thereof. As noted in the discussion of the construction of the machine, the feed finger carrier was cammed into a cocked spring position during the feed slide retraction of the previous cycle and has been held in that position by the solenoid. During the feeding operation and for a short period thereafter, to be sure that any vibration of the balance arm incident to feeding has settled out, the micro-switch opens the circuit through the controlling relay.

Immediately after the completion of the feeding cycle, a torsional load is gradually applied to the wire from each of its end portions, and the buckets mounted on the receiving tray are consecutively positioned before the balance arm in correspondence with the torque being exerted on the arm. As soon as the torque applied to the wire is adequate to overcome the weight of the primer, the balance arm will lift, completing the circuit through the mercury pool on the arm and through the relay coil. Although it is recognized that inertia in the torsion system will produce a slight time delay between application of the load and lifting of the arm, the delay will be uniform because of the uniform slope of the cam and the constant drive speed.

Energization of the relay coil opens the circuit through the solenoid, releasing the feed finger carrier which, under the influence of its spring, snaps forward. The snapping action of the feed finger ejects the weighed primer into the bucket positioned in opposition thereto. By selection of the angle included within each bucket, the zone of weights received therein may be as small as desired. The positioning of the buckets may be determined by calibration checks with known weights with the machine driven by the motor which will automatically take into account the time delay above referred to.

As the machine completes a rotation, the micro-switch follower drops into the depression in its cam, opening the circuit to the relay, releasing the armature thereof, and closing the circuit through the solenoid. As the feed slide is retracted by the feed cam the feed finger carrier is cammed back to cock the spring and is held in cocked position by the solenoid.

The cycle described above is repeated with each revolution of the main shaft so long as primers are fed to the feed belt and results in the segregation of all the primers of the desired weight in one bucket with the unacceptable product classified in accordance with their weight which will correspond to the nature of the defect.

*Summary*

In accordance with the teachings of this specification, there can be built precision automatic weighing machinery adequate for the determination of weight to practically any desired accuracy in any suitable weight range. The principle of the torsion balance is applicable in any weight range but is particularly useful in the accurate determination of very small weights. A decrease in the diameter of the torsion wire or in the rate of climb of the cam results in a greater spread of weight values per degree of rotation of the main shaft. Also an increase in the diameter of the receiving tray will increase the circumferential spacing of the edges of the receiving buckets and decrease the margin of error due to those articles which have weights falling exactly on a dividing line between buckets and which may therefore fall either way.

Obviously many modifications can be built into a machine of this character, such as further mechanization of the feeding means to avoid the necessity of manual feeding to the tray or automatic discharge from one or more of the receiving buckets to avoid the necessity of stopping the machine to empty the weighed articles. Accordingly, it is to be understood that the form of my invention described is to be taken only as illustrative of only one embodiment thereof and that various modifications may be made without departing from the spirit of the invention as the same may be defined by the following claims.

I claim:

1. A device for weighing articles, said device comprising a balance having an arm on which the articles to be weighed may be placed when said arm is in a rest position; feed means for delivering the articles to a gate adjacent the balance arm; a finger movable through the gate to place the articles individually on the balance arm; means operating in sequence with the feed finger to apply to the arm a graduated increasing counterbalancing force tending to lift the arm from said rest position; a compartmented receiving tray rotatably positioned adjacent the balance arm in accordance with the instantaneous magnitude of the counterbalancing force; and means to impart an ejecting movement to the feed finger to remove the article from the balance arm as the counterbalancing force overcomes the weight thereof and lifts said arm from said rest position into the compartment of the tray corresponding to the weight thereof.

2. A device for weighing articles, said device comprising a torsion balance having an arm on which the articles to be weighed may be placed; means to apply a graduated increasing counterbalancing torsional force to the balance; compartmented receiving means positioned in relation to the balance arm in accordance with the magnitude of the torsional force applied; and means to remove the article from the balance arm when the torsional force has overcome the weight of the article into a compartment of the receiving means corresponding to the weight thereof.

3. A device for weighing articles, said device comprising a frame; a torsion wire; sleeves mounted on the frame and rotatable with respect thereto engaging opposite ends of the torsion wire; means to apply simultaneously a graduated, increasing amount of rotation to the sleeves; a balance arm having one end free and adapted to receive an article to be weighed and having its other end clamped to the torsion wire midway between the ends thereof; compartmented receiving means movably arranged to present successive compartments to the free end of the balance arm, the amount of movement imparted to the receiving means being continuously directly proportional to the magnitude of the rotation of the sleeves; means to place an article on the balance arm; and means to remove the article from the balance arm into a compartment of the receiving means when sufficient rotation has been given to the sleeves to lift the weight and balance arm by torsion in the wire.

4. A device for weighing articles, said device comprising a frame; a torsion wire pivotally suported by the frame at the ends of the wire; means to adjust the tension in the wire; means to simultaneously apply a torsional force to the ends of the wire; a balance arm having a free end adapted to receive an article to be weighed and an end clamped to the torsion wire midway between its ends; a compartmented receiving tray rotatably mounted adjacent the free end of the balance arm, the amount of rotation of said tray being directly proportional to the magnitude of the torsional force applied to the wire; and ejection means operated by movement of the balance arm when the weight of the article is balanced by the torsional force applied to the wire to eject the article from the balance arm into the compartment of the receiving tray then positioned opposite thereto.

5. A device for weighing articles, said device comprising a frame; coaxially bored, opposed, wire supporting brackets mounted on the frame; torsion sleeves rotatably mounted in the brackets; a torsion wire stretched between the outer ends of the sleeves and extending through said sleeves; a torsion balance arm having a free end on which an article to be weighed may be placed and its other end clamped to the wire midway between the ends thereof; means to gradually rotate the sleeves simultaneously and in the same direction; compartmented receiving means movably arranged to successively present the compartments adjacent the free end of the balance arm, the amount of movement being continuously directly proportional to the rotation of the sleeves; and ejection means responsive to rotation of the balance arm about the axis of the wire to remove an article from the balance arm into the compartment then opposed thereto.

6. A device for weighing articles, said device comprising a frame; coaxially bored, opposed wire supporting brackets mounted on the frame; torsion sleeves rotatably supported in the brackets and extending inwardly therethrough; a torsion wire extending through the sleeves and non-rotatably attached to the outer end of each sleeve; a torsion balance arm having a free end on which an article to be weighed may be placed and means on the other end of the arm adapted to non-rotatably grip the mid-section of the torsion wire; a bracket on the frame; a balance wire extending from the bracket to the said other end of the balance arm, being joined thereto at a point coinciding with the axis of the torsion wire; means to cause the sleeves, simultaneously and in the same direction, to follow a cycle of gradually increasing rotation and return to the starting point; compartmented receiving means movably mounted to successively present the compartments adjacent the free end of the balance arm, the amount of movement being continuously directly proportional to the rotation of the sleeves; and ejection means responsive to swinging of the free end of the balance arm upwardly about the axis of the wire to remove an article from the balance arm into a compartment of the receiving means then positioned adjacent thereto.

7. A device for weighing articles, said device comprising a frame; coaxially bored, opposed, wire supporting brackets mounted on the frame; torsion sleeves rotatably supported in the brackets and extending inwardly therethrough; a torsion wire extending through the sleeves and non-rotatably secured on the axis thereof at the outer end of each sleeve; a torsion balance arm having one end non-rotatably attached to the mid-section of the wire and having a free end on which an article to be weighed may be placed; interconnected gear drive means engaged with the inner ends of the sleeves whereby the sleeves are constrained to rotate together, and in the same direction; a driven shaft; a cam on the shaft; a lever engaging the gear drive means and having a follower riding on the cam whereby the sleeves go through a predetermined cycle of wire torsioning rotation and return for each revolution of the shaft; compartmented receiving means movably mounted to successively present the compartments adjacent the free end of the balance arm, the amount of movement being continuously directly proportional to the rotation of the sleeves; and ejection means responsive to upward swinging of the free end of the balance arm about the axis of the wire to remove an article from the balance arm into a compartment of the receiving means then positioned adjacent thereto.

8. A device for weighing articles, said device comprising a frame; a torsion wire rotatably supported at its end portions on spaced locations on the frame; a torsion balance arm having one end non-rotatably secured to the mid-section of the wire and having a free end adapted to receive an article to be weighed; means to apply a gradual rotation to the ends of the wire simultaneously and in the same direction; compartmented receiving means movably mounted to present the various compartment successively to a position adjacent the free end of the balance arm, the amount of such motion being continuously directly proportional to the rotation of the ends of the wire; a feed tray mounted on the frame; a delivery gate adjacent the free end of the balance arm; conveyor means extending between the feed tray and the gate; a feed finger operable through the gate to place an article to be weighed on the balance arm; and means responsive to upward swinging movement of the balance arm about the axis of the wire to remove the article from the balance arm into a compartment of the receiving means then positioned adjacent thereto.

9. A device for weighing articles comprising a frame; coaxially bored, opposed, wire supporting brackets mounted on the frame; torsion sleeves mounted in the brackets with capacity for rotation with respect thereto; adjusting means to govern the axial distance between the sleeves; a torsion wire extending between the sleeves and non-rotatably secured to each sleeve at the outer end thereof; a torsion balance arm having one end clamped upon the wire midway between the ends thereof and having a free end adapted to receive an article to be weighed; gear drive means engaged with the inner ends of the sleeve to rotate the sleeves simultaneously through equal angles; a main shaft; a weighing cam on the main shaft; a lever engaging the gear drive means and having a follower riding on the weighing cam whereby the sleeves will be given a predetermined cyclic rotation and return for each revolution of the main shaft; a second shaft driven by the main shaft, a compartmented receiving tray rotatable with the second shaft and so positioned that its circumference is at one point adjacent the free end of the balance arm; a feed tray mounted on the frame; a delivery gate adjacent the free end of the balance arm; belt feed means extending between the feed tray and the gate; a feed cam on the second shaft; a feed slide reciprocated by the cam in timed relation to said lever; a feed finger carried by the feed slide and adapted to feed individual articles from the delivery gate to the free end of the balance arm; and means actuated by raising of the balance arm to impart further movement to the feed finger to eject the article from the balance arm into the compartment of the receiving tray opposite thereto.

10. In a weighing device, a torsion balance comprising coaxially bored, opposed, wire supporting brackets; torsion sleeves rotatably supported in the brackets; adjustable thrust receiving means engaged between the brackets and the sleeves; a torsion wire extending through the sleeves and non-rotatably secured thereto on the axis thereof; a torsion balance arm having one end clamped about the mid-section of the wire and non-rotatable with respect to the said mid-section; a glass contact plate on the bottom face of the balance arm; a support finger engageable with the plate to limit rotation of the balance arm in one direction; a conductive liquid filled cup on the upper face of the arm; a contact point supported above the cup, completion of an electric circuit through the point and the cup indicating raising of the balance arm; and interconnected driven means engaging the sleeves and constructed and arranged to simultaneously and gradually rotate both sleeves in a direction applying balance arm lifting torsion to the wire.

11. In a weighing device having a weight receiving surface, a feeding and ejection apparatus comprising a feed slide reciprocable in a plane substantially parallel to the weight receiving surface; feed cam means to retract the feed slide; spring means to return the feed slide in a feeding stroke; a feed finger carrier pivotally supported on the feed slide; a spring biasing the carrier toward an advanced position; cam means on the carrier engaging a fixed member adapted to produce retraction of the carrier relative to the slide as the slide is retracted by the feed cam; holding means on the feed slide constructed and arranged to releasably retain the carrier in retracted position relative to the slide; means operable to release the holding means on completion of the weighing operation; and a feed finger mounted on the carrier to push an article to be weighed upon the weight receiving surface as the feed slide is returned and to push the article from said surface by action of the feed finger carrier spring when said holding means is released.

12. A device for inspecting ammunition components, said device comprising a torsion balance having an arm on which the component may be placed for weighing; automatic feed means to place the component on the balance arm; cam means to apply a graduated, increasing, counterbalancing torsional force to the balance; compartmented receiving means positioned in relation to the balance arm in accordance with the magnitude of the counterbalancing force; and means to impart an ejecting movement to the feed means when the counterbalancing force has lifted the article for ejecting the component into the compartment of the receiving means then positioned in opposition thereto.

GEORGE R. ECKSTEIN.

REFERENCES CITED

The following references are of record in the file of this patent:

UNITED STATES PATENTS

| Number | Name | Date |
|--------|------|------|
| 745,417 | Church | Dec. 1, 1903 |
| 2,364,832 | Weckerly | Dec. 12, 1944 |
| 2,417,642 | Gilchrist | Mar. 18, 1947 |

FOREIGN PATENTS

| Number | Country | Date |
|--------|---------|------|
| 421,607 | Great Britain | Dec. 27, 1934 |